United States Patent [19]

Chandler

[11] 4,259,872

[45] Apr. 7, 1981

[54] GROUND WHEEL DRIVE APPARATUS

[76] Inventor: Earl E. Chandler, P.O. Box 1624, Coolidge, Ariz. 85228

[21] Appl. No.: 53,411

[22] Filed: Jun. 29, 1979

[51] Int. Cl.³ .............................................. F16H 37/00
[52] U.S. Cl. ........................................ 74/13; 56/14.8;
172/106; 180/53 R; 180/53 A
[58] Field of Search ............... 74/13, 15, 11; 239/661,
239/670, 685; 180/53 A, 53 D, 53 WA, 53 R;
172/105, 106; 56/14.8

[56] References Cited

U.S. PATENT DOCUMENTS

| | | | |
|---|---|---|---|
| 2,536,532 | 1/1951 | Boettger | 74/13 X |
| 2,843,992 | 7/1958 | Jones | 56/14.8 |
| 2,935,834 | 5/1960 | Vaughn | 56/14.8 |
| 3,126,748 | 3/1964 | Mostrong | 74/13 |
| 3,393,875 | 7/1968 | Bryant, Jr. | 239/685 X |
| 3,527,109 | 9/1970 | Grandrud | 74/13 |
| 4,117,891 | 10/1978 | Neukom | 74/13 X |

Primary Examiner—C. J. Husar
Assistant Examiner—Moshe I. Cohen
Attorney, Agent, or Firm—Herbert E. Haynes, Jr.

[57] ABSTRACT

A ground wheel drive apparatus for producing rotational power to drive seed planters, fertilizer applicators or other devices of the type carried on a farm machine. The apparatus includes a fixed frame for mounting on the toolbar of the farm machine and that frame has a transverse drive shaft journaled thereon. A trailing frame is pivotably carried on the transverse drive shaft and has a ground engaging wheel journaled on its extending end. One end of the transverse drive shaft is coupled to the ground engaging wheel and the other end is coupled to the devices on the farm machine so that rotation of the wheel drives the transverse shaft which in turn drives the devices on the farm machine.

6 Claims, 5 Drawing Figures

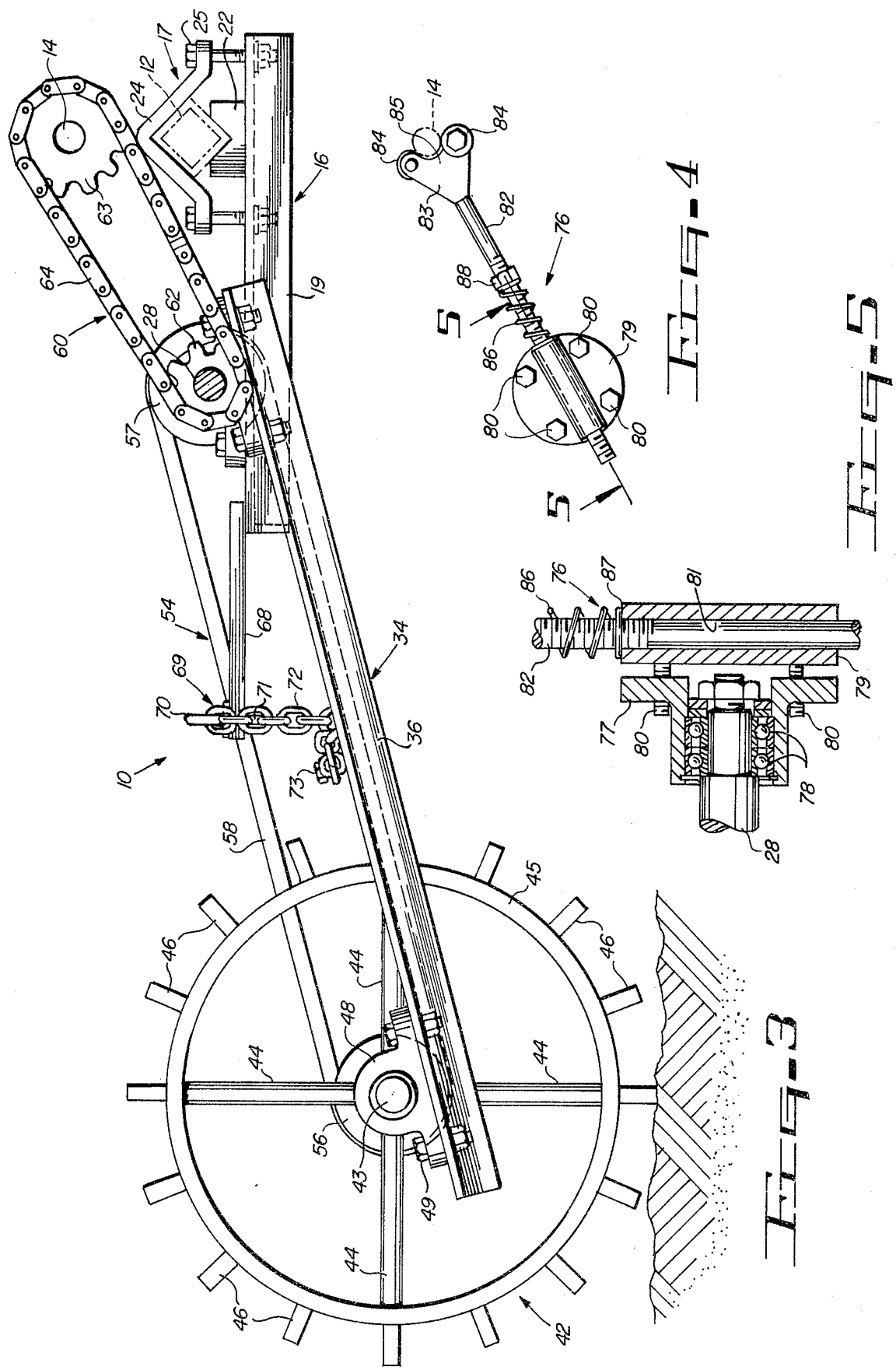

GROUND WHEEL DRIVE APPARATUS

BACKGROUND OF THE INVENTION

1. Field of the Invention

This invention relates to drive mechanisms and more particularly to a ground wheel drive apparatus for use with farm machinery.

2. Description of the Prior Art

Mechanized farm machinery have utilized ground wheel drive devices for some time to provide auxiliary power to drive seed planters, fertilizer applicators, herbicide applicators and other similar devices. The most common of such farm machines is a tractor having an adjustable device commonly referred to as a toolbar on the back thereof. Although toolbars are used to accomplish various tasks, in this application, a plurality of seed planters, fertilizer applicators or herbicide applicators, hereinafter simply referred to as applicators, are mounted in spaced increments along the length of the toolbar, and are operated by a single drive shaft which is spaced above and parallel with respect to the toolbar. The single drive shaft is connected to each of the applicators so that rotation of the drive shaft will simultaneously operate the applicators.

In accomplishing tasks of this nature, it is important that the applicators operate at a speed which corresponds to the speed of the tractor to insure uniform material application. For this reason, the ground wheel drive device is the most desirable power source for this purpose.

Prior art ground wheel drive devices of the most commonly used type are clamped onto the toolbar and provide a rigid plate extending rearwardly therefrom. A trailing frame is pivotably mounted on the rearmost end of the rigid plate, and a ground engaging wheel is rotatably journaled at the rearmost end of the trailing frame. In this manner, the trailing frame is free to pivotably move in response to the ground wheel following the contour of the land when the device is pulled along behind the tractor, and in response to bouncing or other movements of the tractor.

The ground engaging wheel rotatably drives a transverse drive shaft, by means of a first chain-sprocket assembly, with the transverse drive shaft being rotatably journaled on the trailing frame adjacent the forward end thereof. A second chain-sprocket assembly interconnects the transverse drive shaft of the ground wheel drive device with the applicator drive shaft. A spring-loaded idler sprocket assembly is provided on the rigid plate and is biased so as to engage the non-pulling, or slack, portion of the chain of the second chain-sprocket assembly.

The above described prior art ground wheel drive device is very troublesome in that the chain of the second chain-sprocket assembly is subject to jumping off, i.e., becoming disengaged from, the sprockets upon changes of more than a minor nature in the trailing attitude of the trailing frame, and when the tractor is backed up.

When the prior art ground wheel device is being attached to the toolbar, the chain of the second chain-sprocket assembly is adjusted to have the proper tension when an aligned relationship exists between the applicator drive shaft, the pivot axis of the trailing frame and the transverse drive shaft. When any change in the trailing attitude of the trailing frame occurs as a result of the ground engaging wheel encountering an irregularity in the land, the transverse drive shaft will be moved in an arcuate path about the pivot axis of the trailing frame. Such movement of the transverse drive shaft will alter the above described aligned relationship and will shorten the distance between the applicator drive shaft and the transverse drive shaft with a resulting loosening of the chain. When the change in the attitude of the trailing frame is relatively small, the spring-loaded idler sprocket will automatically maintain proper tension on the chain. However, relatively large changes in the attitude of the trailing frame, say for example, of more than five or six inches of arcuate movement of the wheel about the pivot axis of the frame, the idler sprocket cannot take up all the resulting looseness of the chain and the loosened chain will easily become disengaged.

When the tractor is backed up, the ground engaging wheel will be rotated in a reverse direction and the heretofore slack portion of the chain will become the taut portion and the chain will reverse its direction. These actions force the idler sprocket out of engagement with the chain and the resulting looseness of the chain will cause it to jump off of its sprockets.

The physical location of the ground wheel drive apparatus is such that the operator of the tractor cannot watch it constantly. However, due to the chain jumping problem of the prior art structures, he must make periodic checks. Whenever the chain of the ground wheel drive assembly does become disengaged, it is a very time consuming and frustrating occurrence for the operator in that he must not only reinstall the chain, he must back up the tractor to rework the ground missed during the time that his equipment was inoperative.

Therefore, a need exists for a new and improved ground wheel drive apparatus which overcomes some of the problems and shortcomings of the prior art.

SUMMARY OF THE INVENTION

In accordance with the present invention, a new and improved ground wheel drive apparatus is disclosed for providing auxiliary power to operate various devices on farming machines. The apparatus includes a first, or fixed frame one end of which is for attachment to a toolbar of a farm machine. The other end of the fixed frame extends from the toolbar and has a transverse drive shaft rotatably journaled thereon, with the axis of the transverse drive shaft being parallel to the toolbar. The transverse drive shaft is also rotatably journaled on one end of a second, or trailing frame so that the trailing frame is pivotably movable about the axis of the transverse drive shaft. The opposite end of the trailing frame has a ground engaging wheel rotatably journaled thereon. A first drive means couples the axle of the ground engaging wheel with the transverse drive shaft so that the shaft is rotatably driven upon rotation of the ground engaging wheel. A second drive means is employed to couple the rotary motion of the transverse drive shaft with the applicator drive shaft of the farm machine to drive the various devices on the farm machine.

With the pivot axis of the trailing frame being coaxial with the rotational axis of the transvese drive shaft, the tension on both the first drive means and the second drive means remains constant regardless of the amount of pivotably movement of the trailing frame. This not only eliminates, or at least substantially reduces, the changes of drive means disengagement, but allows the idler sprocket assembly required in the prior art structures to be eliminated in the ground wheel drive apparatus of the present invention.

Accordingly, it is an object of the present invention to provide a new and improved ground wheel drive apparatus.

Another object of the present invention is to provide a new and improved ground wheel drive apparatus having a first and a second drive means for coupling the rotary motion of a ground engaging wheel to an applicator drive shaft on a farm machine with both the first and the second drive means being constant tension driving devices.

Another object of the present invention is to provide a new and improved ground wheel drive apparatus which includes a fixed frame for attachment to the toolbar of a tractor and having a transverse drive shaft journaled thereon, a trailing frame pivotably carried on the transverse drive shaft and having a ground engaging wheel. A first drive means couples rotary motion from the ground wheel to the transverse drive shaft and a second drive means couples rotary motion from the transverse drive shaft to the applicator drive shaft of the tractor.

Still another object of the present invention is to provide a new and improved ground wheel drive apparatus of the above described type wherein the pivot axis of the trailing frame and the rotational axis of the transverse drive shaft are coaxial so that the tension on the first and second drive means remains constant regardless of pivotable movement of the trailing frame.

The foregoing and other objects of the present invention, as well as the invention itself, may be more fully understood from the following description when read in conjunction with the accompanying drawings.

BRIEF DESCRIPTION OF THE DRAWINGS

FIG. 3 is a sectional view taken along the line 3—3 of FIG. 2.

FIG. 4 is a sectional view taken along the line 4—4 of FIG. 2.

FIG. 5 is an enlarged fragmentary sectional view taken along the line 5—5 of FIG. 4.

DESCRIPTION OF THE PREFERRED EMBODIMENT

Figure 1:
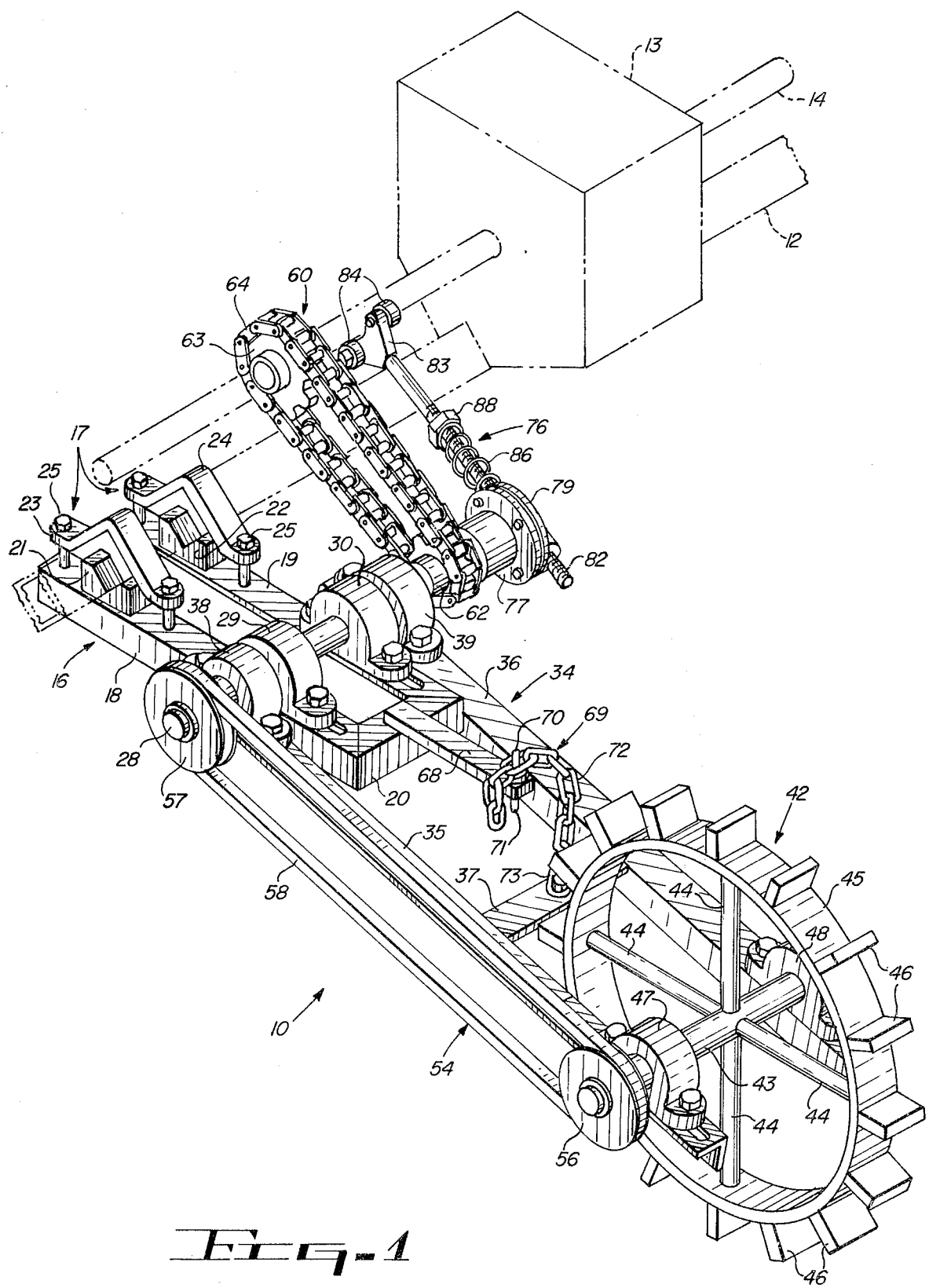
FIG. 1 is an isometric view of the ground wheel drive apparatus of the present invention illustrating the various features thereof.
Figure 2:
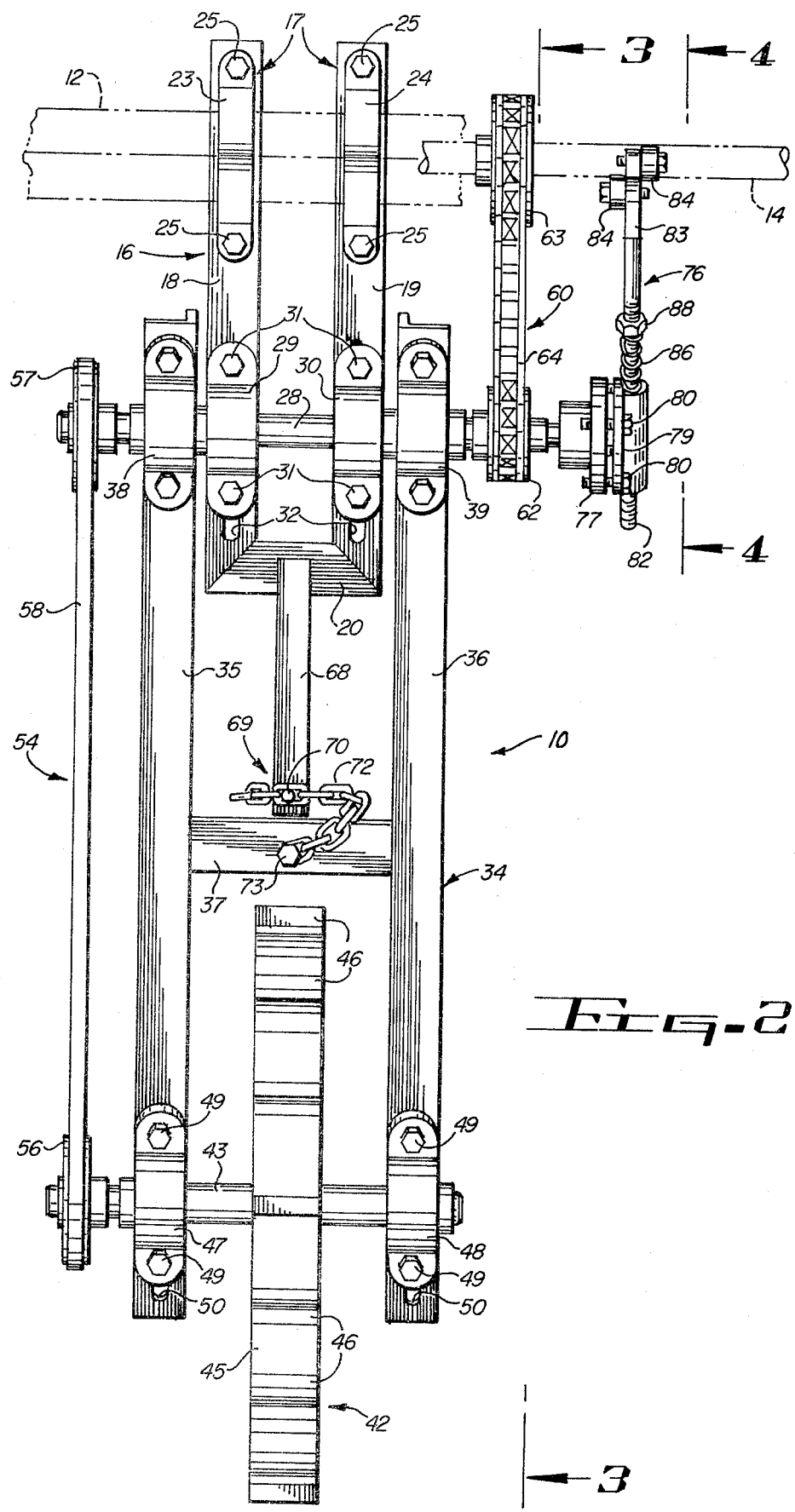
FIG. 2 is an enlarged plan view of the ground wheel drive apparatus of the present invention.

Referring more particularly to the drawings, FIGS. 1 and 2 illustrate the ground wheel drive apparatus of the present invention which is indicated generally by the reference numeral 10.

As will hereinafter be described in detail, the apparatus 10 is designed to be pulled along behind a suitable farm machine such as a tractor (not shown) to provide auxiliary power to operate various devices carried by the farm machine. As is customary, the tractor (not shown) is provided with an elongated adjustable toolbar 12 upon which a plurality of applicator devices 13 (one shown) are mounted in spaced increments. The applicators 13 may be any of a variety of devices for accomplishing such tasks as seed planting, fertilizer application, herbicide application and the like. The applicators 13 are simultaneously operated by a single elongated applicator drive shaft 14 which is suitably supported above the toolbar 12 so as to be parallel therewith.

The ground wheel drive apparatus 10 includes a first, or fixed frame 16 of generally rectangular configuration having connection means 17 mounted on one end thereof by which the frame 16 is demountably attached to the toolbar 12. The frame 16 includes a spaced pair of side rails 18 and 19 which are connected by an end rail 20. The connection means 17 may be any of several well known devices with the type shown including V-blocks 21 and 22, each attached, such as by welding, to a different one of the side rails 18 and 19. The V-blocks 21 and 22 are intended for placement in bearing engagement with the toolbar 12, and are held in such engagement with inverted V-shaped straps 23 and 24 which are demountably attached to the side rails 18 and 19 of the fixed frame 16 such as with bolts 25.

Although the fixed frame 16 is most often connected to the toolbar 12 so as to extend rearwardly therefrom in the manner shown, it should be noted that the frame 16 may be inverted, mounted so as to depend from the toolbar, or mounted so as to be upstanding therefrom, with this versatility being employed to adjust the disposition of the ground wheel drive apparatus 10 to suit the position of the adjustable toolbar 12.

A transverse drive shaft 28 is rotatably journaled on the fixed frame 16 at a location adjacent the extending end thereof with such journaling being accomplished by an aligned spaced apart pair of bearing means in the preferred form of pillow blocks 29 and 30. The pillow blocks 29 and 30 are mounted on the side rails 18 and 19, respectively, by suitable bolts 31 which are mounted in elongated slots formed in their respective side rails for adjustment purposes as will hereinafter be described.

The ground wheel drive apparatus 10 also includes a second, or trailing, frame 34 which is pivotably attached at its forwardly disposed end to the rearwardly disposed end of the fixed frame 16. The trailing frame 34 includes a spaced pair of elongated side rails 35 and 36 which are interconnected by a plate 37 which extends transversely between the rails at a point intermediate the opposite ends of the rails. A pair of bearing means in the preferred form of pillow blocks 38 and 39 are suitably mounted on the side rails 35 and 36 so as to be disposed in spaced aligned relationship with respect to each other and to be disposed at the forwardmost end of the trailing frame 34. The transverse drive shaft 28 is rotatably journaled in the pillow blocks 38 and 39 so that the trailing frame 34 is pivotably movable about the rotational axis of the transverse drive shaft 28. Therefore, with the transverse drive shaft 28 being coupled to the fixed frame 16 by the pillow blocks 29 and 30, and being coupled to the trailing frame 34 by the pillow blocks 38 and 39, the transverse drive shaft is seen to be free to rotate in the pillow blocks 29, 30, 38 and 39, and to pivotably couple the trailing frame 34 to the fixed frame 16.

The opposite, or rearwardly disposed end of the trailing frame 34 has a ground engaging wheel 42 rotatably journaled thereon. The wheel 42 includes an axle 43 having a plurality of spokes 44 extending radially therefrom into supporting engagement with a rim 45. The outwardly facing surface of the rim 45 is provided with a plurality of radially extending cleats 46 which provide the necessary traction for rotation of the wheel. The axle 43 of the ground engaging wheel 42 is rotatably journaled in a spaced pair of aligned bearing means in the preferred form of pillow blocks 47 and 48 which are mounted on the rearwardly disposed ends of the side rails 35 and 36, respectively, such as by bolts 49 which are positioned in elongated slots 50 formed in the rails so that the pillow blocks can be moved for adjustment purposes as will hereinafter be described in detail.

A first drive means 54 is connected so as to rotatably drive the transverse drive shaft 28 upon rotation of the ground engaging wheel 42. In the preferred embodiment, the first drive means 54 is a belt drive assembly which includes a drive pulley 56 suitably mounted fast with an extending end of the wheel axle 43, a driven pulley 57 mounted fast on one of the extending ends of the transverse drive shaft 28, and a suitable drive belt 58. Proper tension of the drive belt 58 is achieved by longitudinally moving the pillow blocks 47 and 48 along the length of the side rails 35 and 36 with such longitudinal positioning being possible due to the elongated slots 50 in which the bolts 49 of the pillow blocks are mounted as hereinabove described.

A second drive means 60 is connectable so as to rotatably drive the applicator drive shaft 14 upon rotation of the transverse drive shaft 28. In the preferred embodiment, the second drive means 60 is a chain drive mechanism which includes a drive sprocket 62 that is mounted fast on the transverse drive shaft 28, a driven sprocket 63 which is carried fast on the applicator drive shaft 14, and a suitable chain 64. Proper tensioning of the chain is achieved by longitudinally moving the pillow blocks 29 and 30 on their respective side rails 18 and 19 of the fixed frame 16, with this movement being possible due to the longitudinal slots 32 in which the pillow block mounting bolts 31 are positioned as hereinbefore described.

With the trailing frame 34 being free to pivotably move about the rotational axis of the transverse drive shaft 28, as hereinbefore described, it will be seen that the tension on the belt 58 and the tension on the chain 64 will not change regardless of the trailing attitude of the trailing frame. In other words, in operation of the apparatus 10, the distance between the wheel axle 43 and the transverse drive shaft 28 remains constant and the distance between the transverse drive shaft 28 and the applicator drive 14 remains constant, and therefore the drive means 54 and 60 of the apparatus 10 are not subject to disengagement problems.

As seen best in FIGS. 2 and 3, a cantilever tongue 68 extends from the end rail 20 of the fixed frame 16 toward the trailing frame 34, and is provided with a dual shank pin 69 at its extending or free end. The pin 69 is normal to the planar surface of the tongue 68 and has a first shank 70 and an oppositely extending shank 71 (seen in FIG. 1). A chain 72 is suitably connected on one of its ends such as by a bolt 73 to the transverse plate 37 of the trailing frame 34, and the opposite end of the chain is free for adjustable looped over positioning on one or the other of the shanks 70 or 71 of the dual shank pin 69. This chain, tongue and pin assembly is the preferred form of a movement limiting means which is provided to limit the downward pivotal movement of the trailing frame 34 so that when the adjustable toolbar 12 is raised, the ground engaging wheel 42 of the apparatus 10 can be lifted off of the ground. This lifitng capability is desirable during non-working transport of the tractor (not shown) such as to and from a field, between fields, when turning the tractor around and at any other time when applicator operation is not desired. In operation, the chain 72 is looped over the pin 69 so that the chain is slack and thus will not interfere with normal operation of the apparatus 10 when the toolbar is lowered to the working position. The purposes for the two shanks 70 and 71 will be appreciated upon consideration of the fact that the fixed frame 16 may be mounted in various positions on the toolbar 14 as hereinbefore described. For example, when the frame 16 is mounted as shown best in FIG. 3, the chain 72 is looped over the shank 70 of the pin 69, and in the event that the frame 16 is mounted in the inverted position (not shown) the opposite shank 71 is used. Other well known means can be used for this purpose such as a slotted linkage assembly and the like.

As shown in FIGS. 1, 2, 4 and 5, the apparatus 10 may be provided with a stabilizer means 76 which extends radially from the transverse drive shaft 28 into bearing engagement with the applicator drive shaft 14. The product dispensed by the applicators 13 is not always of uniform consistency, for example, fertilizers will oftentimes tend to cake in the presence of moisture. Such caking can form very hard lumps and when the applicators 13 engage such lumps during their normal product dispensing operation, the applicator drive shaft 14 will flex and in severe cases can become bent. The stabilizer means 76 is designed to dampen flexing of the applicator drive shaft 14 and hamper bending thereof. The stabilizer means 76 not only protects the applicator drive shaft 14, but due to its dampening capabilities will prevent, or at least substantially reduce, the possibility of shaft flexing shortening the distance between the transverse drive shaft 28 and the applicator drive shaft 14 to a point where excessive loosening of the chain 64 occurs.

The stabilizer means 76, as shown in FIG. 5, includes a first plate 77 which is rotatably journaled by bearings 78 on the end of the transverse drive shaft 28 to allow the shaft to rotate without transmitting any rotational movement to the plate. A second plate 79 is attached, such as by bolts 80, to the first plate 77, and the second plate has a bore 81 extending diametrically thereacross. An elongated rod 82 is slidably mounted in the bore 81 of the second plate 79 which positions the rod as being radially disposed with respect to the rotational axis of the transverse drive shaft 28. The extending end of the rod 82 has a substantially triangular plate 83 mounted thereon, and the plate carries a spaced apart pair of rollers 84. The plate 83 has one of its edges 85 shaped in an arcuate configuration so that the rollers will bear against the periphery of the applicator shaft 14 in the manner shown in FIG. 4. A spring 86 is mounted on the rod 82 and extends between a shoulder 87 on the plate 79 and an adjustment nut 88 threadingly carried on the rod. The spring 86 biasingly urges the rod 82 toward applicator drive shaft 14 and thus loads the rollers 84 into bearing engagement with the periphery of the applicator drive shaft 14.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A ground wheel drive apparatus for trailing attachment to the toolbar of a farm machine to provide rotary power to the applicator drive shaft of the farm machine when said apparatus is towed behind the farm machine, said ground wheel drive apparatus comprising:
   (a) a first frame for fixed attachment to the toolbar of the farm machine, said first frame having an extending end;
   (b) a transverse drive shaft rotatably journaled on the extending end of said first frame and disposed to be parallel with the toolbar and applicator drive shaft of the farm machine;
   (c) a second frame having said transverse drive shaft rotatably journaled on one end thereof so that said second frame is pivotably movable about the rotational axis of said transverse drive shaft;
   (d) a ground engaging wheel rotatably journaled on the opposite end of said second frame;
   (e) a first drive means connected between the axle of said ground engaging wheel and said transverse drive shaft for rotatably driving said transverse drive shaft upon rotation of said ground engaging wheel;
   (f) a second drive means for connection between said transverse drive shaft and the applicator drive shaft of the farm machine for driving the applicator drive shaft when said transverse drive shaft is rotatably driven; and
   (g) stabilizer means extending radially from said transverse drive shaft for engaging the applicator drive shaft of the farm machine to dampen flexing of the applicator drive shaft and to maintain a substantially constant distance between the applicator drive shaft and said transverse drive shaft.

2. A ground wheel drive apparatus as claimed in claim 1 wherein said first frame is provided with a pair of connection means mounted thereon for invertably attaching said first frame to the toolbar of the farm machine.

3. A ground wheel drive apparatus as claimed in claim 1 wherein said first frame is provided with a pair of connection means mounted thereon for attachment of said first frame to the toolbar of the farm machine in various radially extending directions.

4. A ground wheel drive apparatus as claimed in claim 1 wherein said stabilizer means comprises:
   (a) plate means rotatably journaled on one end of said transverse drive shaft and having a bore formed therethrough which is transverse to the rotational axis of said transverse drive shaft;
   (b) an elongated rod slidably mounted in the bore of said plate means;
   (c) a spaced pair of rollers mounted on the end of said rod for engaging the periphery of the applicator drive shaft of the farm machine; and
   (d) biasing means in engagement with said rod and with plate means for biasing said rollers into bearing engagement with the periphery of the applicator drive shaft of the farm machine.

5. A ground wheel drive apparatus as claimed in claim 1 and further including a movement limiting means for adjustably and loosely interconnecting said second frame and said first frame to limit the downward pivotable movement of said second frame to allow said ground engaging wheel to be lifted off of the ground when the toolbar of the farm machine is raised for non-working transport purposes.

6. A ground wheel drive apparatus as claimed in claim 4 wherein said movement limiting means comprises:
   (a) a cantilever tongue extending from said first frame toward said second frame;
   (b) pin means on the extending end of said cantilever tongue and having at least one shank which is normal to said cantilever tongue; and
   (c) a chain having one of its ends connected to said second frame and having its other end free for looped over positioning on the shank of said pin means with said chain being slack during normal working operations and becoming taut upon raising of the toolbar of the farm machine.

* * * * *